H. M. SHREINER.
COLORED GLASS.
APPLICATION FILED OCT. 29, 1910.

990,303.

Patented Apr. 25, 1911.
2 SHEETS—SHEET 2.

WITNESSES:
Charles Gompert
Edward S. Burke

INVENTOR
Henry Martin Shreiner

H. M. SHREINER.
COLORED GLASS.
APPLICATION FILED OCT. 22, 1910.

990,303.

Patented Apr. 25, 1911.
2 SHEETS—SHEET 2.

WITNESSES:
Charles Gompert
Edward S. Burke

INVENTOR
Henry Martin Shreiner

UNITED STATES PATENT OFFICE.

HENRY M. SHREINER, OF NEW YORK, N. Y.

COLORED GLASS.

990,303.

Specification of Letters Patent.   Patented Apr. 25, 1911.

Application filed October 29, 1910.   Serial No. 589,767.

*To all whom it may concern:*

Be it known that I, HENRY MARTIN SHREINER, a citizen of the United States of America, residing at 246 Penn street, in the borough of Brooklyn, city and State of New York, have invented certain new and useful Improvements in Colored Glass, of which the following is a description.

The disadvantages of the various makes and kinds of colored glass now used for lenses and other scientific purposes are: If the so-called "pot colored" glass is ground to convex or concave form, its uniform percentage of color is destroyed. The so-called "flashed" glass permits grinding on the unflashed side only without destroying the uniform percentage of color.

My invention relates to an improvement in making colored glass to be used for manufacturing lenses for spectacles, eye glasses, pince nez, lorgnettes, opera glasses, field glasses, bird glasses, telescopes, cameras and other optical, electrical and scientific instruments, such as are used in submarines, ocean vessels, balloons, aeroplanes and for other purposes, so that in lenses made from glass of my invention, the percentage of color is not destroyed or reduced by the ordinary means employed in the art of manufacturing lenses of any curve or focus, or any combination of curves or foci. I proceed by placing one or more sheets or layers of pot colored glass between two or more sheets of white, transparent glass and combine these into one homogeneous mass by fusing by heat; although the various layers may be combined by other means, such as cementing with adhesive substance as Canada balsam, Prince Rupert drops, or the like.

To better illustrate my invention, reference is had to the accompanying drawings which form a part of this specification.

Figure 1:
Figure 2:
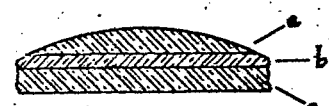
Figure 3:
Figure 4:
Figure 5:
Figure 6:
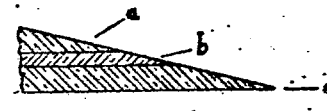
Figure 7:
Figure 8:
Figure 9:
Figure 10:
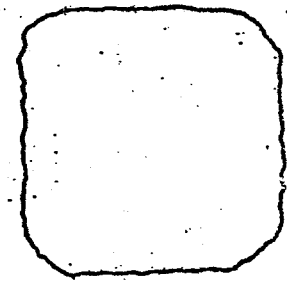
Figure 11:
Figure 14:
Figure 12:
Figure 15:
Figure 13:
Figure 16:
Figure 17:
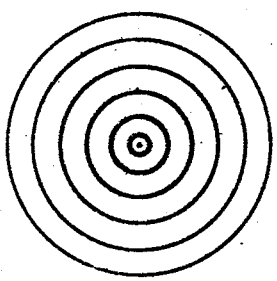
Figure 18:
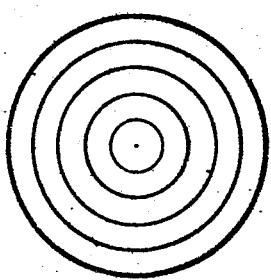

Figure 1 represents a piece of colored glass produced according to my invention: a, represents sheets of white, transparent glass of any desired thickness or thicknesses, index or indices of refraction; b, represents sheet or sheets of "pot colored" glass of a color or colors to produce the shade, tint or combination of colors desired, the whole combined into one mass. Fig. 2 represents this glass ground to plano convex form; Fig. 3 ground to plano concave form; Fig. 4 ground to biconvex form; Fig. 5 ground to biconcave form; Fig. 6 ground in the shape of a right angle prism (although prisms of any other form may as readily be made); Fig. 7 represents a piece of glass similar to Fig. 1, except that for convenience and to save labor it has been bent by heat into what is known in the trade as a "dropped blank"; Fig. 8 represents a dropped blank of my colored glass in periscopic or toric convex form; Fig. 9 represents it in periscopic or toric concave form. Fig. 10 represents the top view of an original blank. This is to illustrate that my colored glass may be ground into lenses of any curve or foci, without in any way destroying or reducing the percentage of uniformity of color. Fig. 11 represents a piece of pot colored glass; Fig. 12 represents the same ground to convex form; Fig. 13 ground to concave form; showing how the uniformity of percentage of color is destroyed by grinding such glass; Fig. 14 represents a piece of so-called flashed glass in its original state; Fig. 15 represents the same glass ground to convex form; Fig. 16 ground to concave form. This is to illustrate the limitations of the use of flashed glass. Fig. 17 represents a top view of a convex lens made from "pot colored" glass, showing a greater percentage of color in the center; Fig. 18 represents a top view of a concave lens made from pot colored glass showing a greater percentage of color on the edge.

I do not claim to be the first to make colored glass for optical or other purposes, but I do claim to be the first to produce a colored glass in a homogeneous mass wherein the color or colors are so placed that the same are absolutely fixed and uniform in the glass in its crude state, making it possible to grind any one curve or section of same, such as spherical, cylindrical, periscopic, meniscus, toric, hyperbolic, conchoidial or ellipsilodial, or any combination of same without destroying or reducing the percentage of color, so that lenses made from colored glass of my invention may be depended upon as absolutely reliable and uniform, and that they will always have the same relative amount of color when finished as the glass had in its rough state.

What I claim as new and desire to secure by Letters Patent is:

1. A colored optical glass consisting of one or more layers of pot colored glass contained between two layers of white, transparent glass of the same or different thicknesses or indices of refraction, substantially as hereinbefore described.

2. A colored optical glass consisting of one or more layers of pot colored glass contained between two or more layers of white, transparent glass of the same or different thicknesses or indices of refraction, substantially as hereinbefore described.

In testimony whereof, I have signed my name in the presence of two subscribing witnesses.

HENRY M. SHREINER.

Witnesses:
CHARLES GOMPERT,
EDWARD S. BURKE.